H. J. HAHN.
STALK RAISER.
APPLICATION FILED DEC. 4, 1919.

1,344,761.

Patented June 29, 1920.

Inventor
Herman J. Hahn
by
Owen, Owen & Crampton

UNITED STATES PATENT OFFICE.

HERMAN J. HAHN, OF NAPOLEON, OHIO.

STALK-RAISER.

1,344,761.   Specification of Letters Patent.   Patented June 29, 1920.

Application filed December 4, 1919. Serial No. 342,424.

*To all whom it may concern:*

Be it known that I, HERMAN J. HAHN, a citizen of the United States, and a resident of Napoleon, in the county of Henry and State of Ohio, have invented a certain new and useful Stalk-Raiser; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a means for raising the stalks that may have fallen down so as to move them out of the tracks of the horses used to draw an agricultural machine or implement. The invention finds its particular advantage in its application to a corn harvesting machine whereby the blown corn stalks may be raised in advance of the harvesting machine and so as to be engaged and manipulated by the harvesting machine in removing the corn from the stalks.

The invention may be contained in structures of different forms. For purposes of illustration I have selected one of such structures and shall describe it hereinafter.

Figure 1:
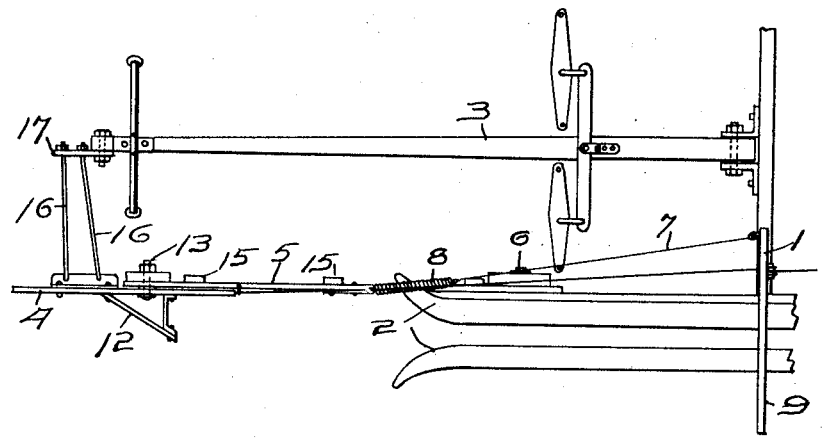
Figure 3:
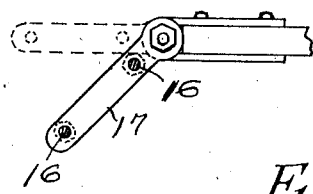
Figure 2:
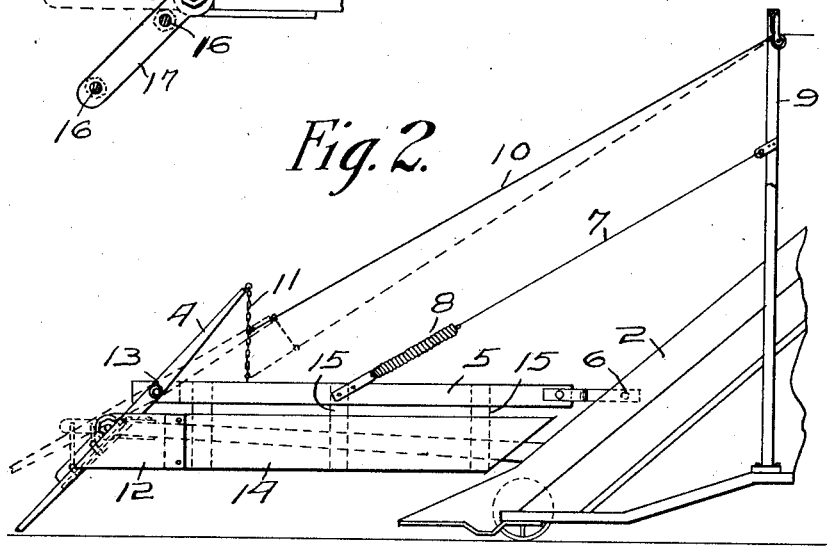

Figure 1 of the drawings illustrates a top view of the part of the corn harvester to which is attached the structure containing my invention. Fig. 2 is a side view of the harvester and the stalk raiser containing my invention. Fig. 3 is a bracket attached to the tongue which maintains the stalk raiser in its proper position relative to the tongue harvester.

1 is the harvester having the usual guide parts 2 for directing the corn stalks and corn to the means for removing the ears of corn. The tongue 3 is located on one side of the guides 2 and is spaced therefrom to permit a horse to be located between the tongue and the guides 2. Stalks that are blown down in front of the horse located between the harvester and the guides 2 are raised by means of the raiser or bar 4 which is pivoted to one end of the bar 5. The bar 5 is pivoted to one of the guides 2 by means of the pin 6 in order that the bar 5 may be raised with the tongue 3 when the horses are about to be hitched to the tongue. The bar 5 is supported by means of a cable 7 having a spring 8 that connects the bar, at about its center, with the frame 9 of the harvester. The bar 5 is thus yieldingly held in its position by the operation of the spring 8. The position of the bar 4 is controlled by a wire or cable 10, that is connected to the center of a chain 11, which is attached to one end of the bar 4 and to the bar 5. Pulling the cable 10 pulls the center of the chain toward the frame 9 and consequently pulls the upper end of the bar 4 down which raises the lower end of the bar. This is for the purpose of maintaining the lower end of the bar a short distance above the ground, particularly during the time that the harvester is being drawn to the corn field and during the turning of the harvester while harvesting the corn in the field. The lower end of the bar 4 will thus pass beneath the corn stalks that have been blown down and raise them as the harvester is pulled along by the horses. To push the corn stalks well over to cause them to stand upright, the bar 4 may be provided with a board 12 that extends rearwardly and outwardly at an angle to the direction of movement of the corn harvester and thus operates to push the corn over as the harvester is moved along. The forward edge of the board 12 is secured to the bar 4 below the pivot pin 13 of the bar 4. In order to support the corn and keep it in line with the space between the guides 2, a board 14 may be connected by suitable means such as by the strips 15 to the bar 5. The forward end of the board 14 lies back of the board 12 and thus insures the support of the corn that is raised by the bar 4. In order that the movement of the bar 4 may be greatly stabilized it may be connected by means of cross bars 16 to a bracket 17 supported on the end of the tongue 3. The bracket 17 may be pivotally connected to the tongue 3 which permits movement of the bar 4 about its pivot pin 13. There is some looseness of play between the ends of the bars 16 and the parts to which they are connected at their ends, so as to allow movement of the bar 4 about the pivot pin 13. The extent of the movement is somewhat limited by the bars 16.

I claim:—

1. In a stalk raiser, an inclined pivoted member, means for moving the pivoted member along one side of the rows of stalks for engaging the blown stalks and raising them, and means for raising the lower end of the pivoted member to engage the stalks at different heights.

2. In a stalk raiser, a pivoted bar, a second bar pivoted to the end of the first named bar and inclined forward with reference to the first named bar, means for raising the second named bar to engage the stalks at different heights, an inclined board extending rearwardly and laterally and supported on the first named bar, and a movable agricultural implement for supporting the first named bar.

3. In a stalk raiser, a pivoted bar, a second bar pivoted to the end of the first named bar and inclined forward with reference to the first named bar, an inclined board extending rearwardly and laterally and supported on the second named bar, a cable connecting the end of the second named bar with the first named bar, and a cable connecting the center to the first named cable for raising the lower end of the second named bar to engage the stalks at different heights, and a movable agricultural implement for supporting the first named bar.

4. In a stalk raiser, a pivoted bar, a second bar pivoted to the end of the first named bar and inclined forward with reference to the first named bar, an inclined board extending rearwardly and laterally and supported on the second named bar, a cable connecting the end of the second named bar with the first named bar, and a cable connecting the center of the first named cable for raising the lower end of the second named bar to engage the stalks at different heights, a movable agricultural implement for supporting the first named bar, and means for yieldingly supporting the first named bar on the agricultural implement.

In testimony whereof I have hereunto signed my name to this specification.

HERMAN J. HAHN.